(12) United States Patent
Silveira et al.

(10) Patent No.: US 12,123,143 B2
(45) Date of Patent: Oct. 22, 2024

(54) PROCESS FOR PRODUCING A NANOCELULLOSIC MATERIAL COMPRISING AT LEAST TWO STAGES OF DEFIBRILLATION OF CELLULOSIC FEEDSTOCK AND AT LEAST ONE INTERMEDIATE FRACTIONING STAGE

(71) Applicant: Suzano S.A., Salvador (BR)

(72) Inventors: Marcos Henrique Luciano Silveira, São José dos Campos (BR); Germano Andrade Siqueira, São José dos Campos (BR); Bibiana Ribeiro Rubini, Jacareí (BR); Heloisa Ogushi Romeiro Ramires, Aracruz (BR)

(73) Assignee: Suzano S.A., Salvador (BR)

( * ) Notice: Subject to any disclaimer, the term of this patent is extended or adjusted under 35 U.S.C. 154(b) by 736 days.

(21) Appl. No.: 17/260,916

(22) PCT Filed: Jul. 17, 2019

(86) PCT No.: PCT/BR2019/050281
§ 371 (c)(1),
(2) Date: Jan. 15, 2021

(87) PCT Pub. No.: WO2020/014762
PCT Pub. Date: Jan. 23, 2020

(65) Prior Publication Data
US 2021/0395949 A1    Dec. 23, 2021

(30) Foreign Application Priority Data
Jul. 17, 2018 (BR) .......................... 102018014608-4

(51) Int. Cl.
*D21H 11/18* (2006.01)
*B02C 23/12* (2006.01)
(Continued)

(52) U.S. Cl.
CPC ............. *D21H 11/18* (2013.01); *B02C 23/12* (2013.01); *C08B 15/08* (2013.01); *D21B 1/30* (2013.01);
(Continued)

(58) Field of Classification Search
CPC ........ D21H 11/18; D21H 11/20; D21H 11/16; D21D 1/20; D21D 5/02; D21D 1/00;
(Continued)

(56) References Cited

U.S. PATENT DOCUMENTS 10,240,288 B2 *  3/2019  Heiskanen ............. D21H 11/18
11,598,049 B2 *  3/2023  Ramires ................. D21C 5/005
(Continued)

FOREIGN PATENT DOCUMENTS

BR    112021000928 A2 *  4/2021  ............. B02C 21/00
CA       3002683 A1      4/2017
(Continued)

OTHER PUBLICATIONS

Guimaraes, M.Jr; Botaro, VR.; Novack, Flauzino, W.P.N; Mendes, L.M; Tonoli, G.H.D. Preparation of Cellulose Nanofibrils from Bamboo Pulp by Mechanical Defibrillation for Their Applications in Biodegradable Composites. Journal of Nanoscience and Nanotechnology, v.15, p. 6751-6768, 2015.
(Continued)

*Primary Examiner* — Jose A Fortuna

(57) ABSTRACT

The present invention relates to a process for producing a nanocellulosic material based on the use of fractioning of cellulosic pulp stream from pre-treatment or mechanical defibrillation (partially refined/defibrillated pulp) in combination with stages of mechanical defibrillation, in which both the accept fraction and the reject fraction can be conveyed to stages of consistency adjustments so as to precede another distinct defibrillation stage. For example, if (Continued)

the accept is conveyed to a consistency adjustment preceding a second defibrillation stage while the reject is conveyed to the other independent stage of consistency adjustment to return to the first stage of mechanical defibrillation.

15 Claims, 21 Drawing Sheets

(51) Int. Cl.
*B82Y 40/00* (2011.01)
*C08B 15/08* (2006.01)
*D21B 1/30* (2006.01)
*D21D 1/30* (2006.01)
*D21D 5/04* (2006.01)

(52) U.S. Cl.
CPC ............. *D21D 1/30* (2013.01); *D21D 5/04* (2013.01); *B82Y 40/00* (2013.01)

(58) Field of Classification Search
CPC . D21D 1/30; D21D 5/04; B82Y 40/00; D21B 1/30; D21B 1/00; D21B 1/04; B02C 23/12; C08B 15/08
See application file for complete search history.

(56) References Cited

U.S. PATENT DOCUMENTS

| | | | | |
|---|---|---|---|---|
| 11,634,509 | B2 * | 4/2023 | Matsusue | C08L 101/00 524/35 |
| 2013/0303749 | A1 * | 11/2013 | Vehniaeinen | D21D 1/20 422/255 |
| 2017/0210826 | A1 | 7/2017 | Nelson et al. | |
| 2018/0298113 | A1 | 10/2018 | Nelson et al. | |
| 2021/0348332 | A1 * | 11/2021 | Mai | D21D 1/22 |
| 2021/0395949 | A1 * | 12/2021 | Silveira | D21H 11/18 |
| 2023/0175203 | A1 * | 6/2023 | Mai | D21D 1/306 162/26 |

FOREIGN PATENT DOCUMENTS

| | | | | |
|---|---|---|---|---|
| CA | 3078582 A1 * | 4/2019 | | C08J 5/18 |
| CN | 108350653 A | 7/2018 | | |
| CN | 112771226 A * | 5/2021 | | B02C 21/00 |
| EP | 3356595 A2 | 8/2018 | | |
| EP | 3825459 A1 * | 5/2021 | | B02C 21/00 |
| JP | 2013545904 A * | 12/2013 | | D21H 11/16 |
| JP | 6775160 B2 * | 10/2020 | | |
| JP | 2023013443 A * | 1/2023 | | |
| WO | WO-2012072874 A1 * | 6/2012 | | B01J 19/00 |
| WO | WO-2016141497 A1 * | 9/2016 | | B27N 3/04 |
| WO | 2017058980 A2 | 4/2017 | | |
| WO | 2018237216 A1 | 12/2018 | | |
| WO | WO-2021172407 A1 * | 9/2021 | | |

OTHER PUBLICATIONS

Lekha, P.; Mtibe, A; Motaung, TE., Andrew, J.E; Sithole. RR; Gibril, M. "Effect of mechanical treatment properties of cellulose nanofibrils produced from bleached hardwood and softwood pulps" Maderas-Ciencia y Tecnologia, v.18. ed.3, 457-466, Jul. 2016.

Velasquez-Cock, J., Ganan, P., Posada, P, Castro, P., Serpa, A, Gomez, C., Putaux, J.L, Zuluaga, R. "Influence of combined mechanical treatments on the morphology and structure of cellulose nanofibrils: Thermal and mechanical properties of the resulting films" Industrial Crops and Products, v.85, Jul. 1-10, 2016. Abstract and Figure 2.

Larsson, P.A; Riazanova, AV; Ciftci, G.C.; Rojas, R.; Ovrebo, RR; Wagberg, L; Berglund, LA Towards optimised size distribution in commercial microfibrillate d cellulose: a fractionation approach. Cellulose, v.26, ed.3, 1565-1575, Dec. 28, 2016., Abstract and scheme 1.

* cited by examiner

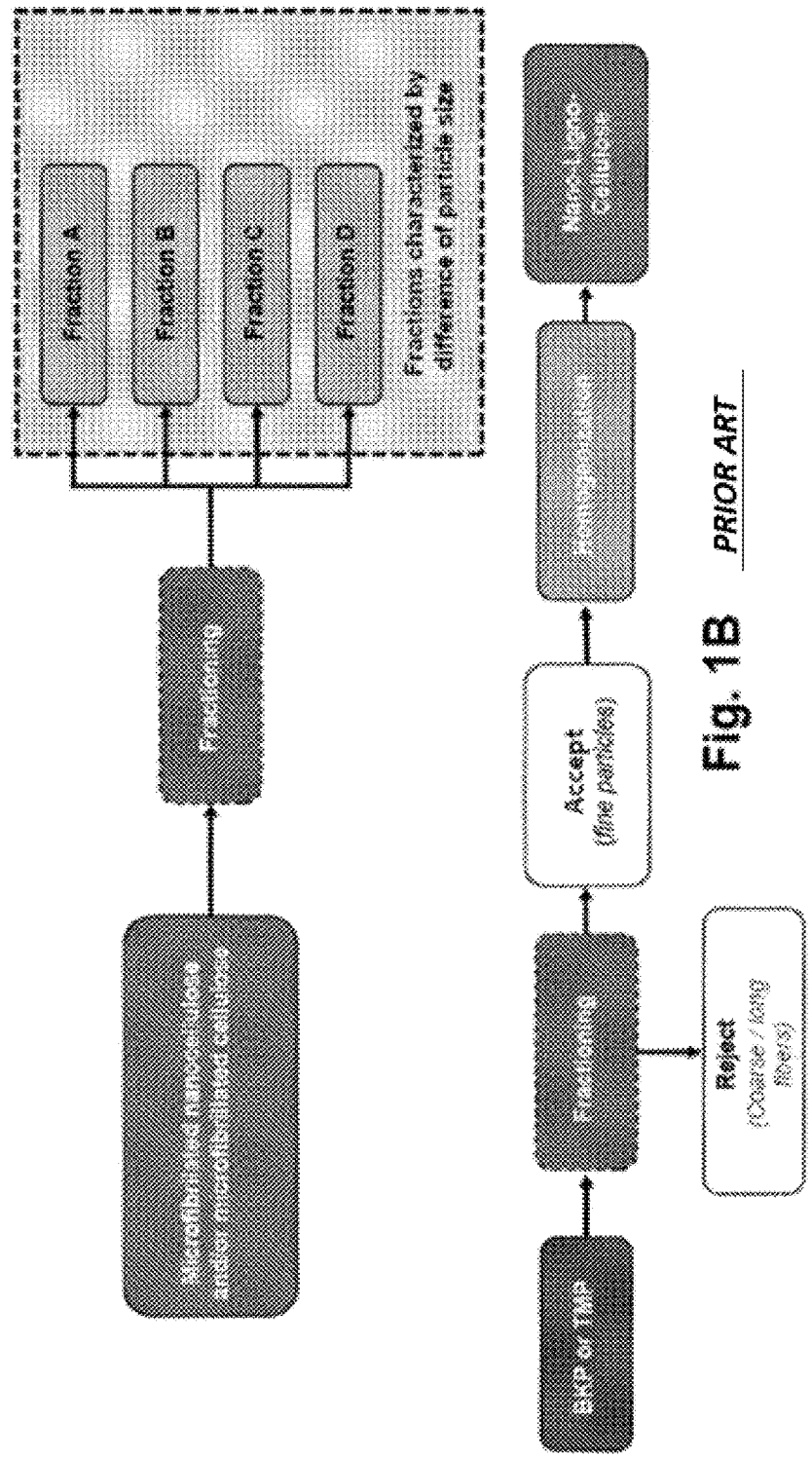

PROCESS FOR PRODUCING A NANOCELULLOSIC MATERIAL COMPRISING AT LEAST TWO STAGES OF DEFIBRILLATION OF CELLULOSIC FEEDSTOCK AND AT LEAST ONE INTERMEDIATE FRACTIONING STAGE

CROSS-REFERENCE TO RELATED APPLICATIONS

This application claims the benefit of International Application No. PCT/BR2019/050281, filed Jul. 17, 2019, which claims the benefit of Brazilian Application No. 102018014608-4, filed Jul. 17, 2018, the contents of which are both hereby incorporated by reference in their entirety.

FIELD OF THE INVENTION

The present invention relates generally to processes for producing nanocellulose based on the use of fractioning of cellulosic pulp stream from a refining process (partially refined/defibrillated pulp) in combination with mechanical defibrillation stages.

BACKGROUND OF THE INVENTION

Nanocellulose is defined as cellulose samples containing cellulose particles having at least a nanoscale dimension (1-100 nm). Its shape and composition depend heavily on the condition and production method. Based on the composition and dimension properties, the nanocellulose can be classified as: (1) cellulose nanocrystals (CNC), also known as cellulose whiskers; (2) cellulose nanofibrils (CNF) and (3) bacterial cellulose (BC).

Methods for the production of nanocellulose may involve mechanical defibrillation which can be performed as the single stage of the procedure, or in combination with biological and/or chemical methods such as pre or post-treatment stages. Therefore, the nanocellulose samples produced are generally a mixture of CNF, CNC and microfibrillated cellulose (MFC), the portion of such fractions being dependent on the process technology and applied conditions, a factor that defines the final quality of the product. In addition, the type of raw material used to produce nanocellulose is also a determining factor in the final quality of the product.

Nanocellulose production methods may be based on pretreatment (chemical, mechanical or biological) followed by mechanical refining, or through a single stage (usually mechanical defibrillation). Enzymatic pre-treatments or chemical oxidation such as the TEMPO method (2,2,6,6-tetramethylpiperidine-1-oxyl radical)-mediated oxidation) (Habibi Y, Chanzy H, Vignon M R: TEMPO-mediated surface oxidation of cellulose whiskers. Cellulose 2006, 13: 679-687) have been widely used to facilitate defibrillation of cellulosic pulp and as a form of nanocellulose production using different samples of lignocellulose. A more comprehensive description can be found in Janardhnan S., Sain M M, Isolation of cellulose microfibrils—an enzymatic approach, BioResources, 2006, 2: 176-188 and Habibi Y, Chanzy H, Vignon M R: TEMPO-mediated surface oxidation of cellulose whiskers. Cellulose 2006, 13: 679-687.

In the article published by Tanaka et al. (Tanaka A., Hoouni, J., Seppanen V., Pirkonem P. Nanocellulose characterization with mechanical fractionation, Nordic pulp and paper research journal, 2012, 27:689-694), the authors proposed the use of the membrane filter fractionation stage as a method of characterizing nanocellulose/microcellulose already produced in terms of particle size (FIG. 1A), and proved that the device used could fractionate CNF samples in terms of particle size.

In addition, Osong and collaborators (Osong, S H, Norgren, S., Engstrand, P., An approach to produce nano-lignocellulose from mechanical pulp fine materials, Nordic Pulp and Paper Research Journal, 2013, 28: 472-479), demonstrated the production of nano-lignocellulosic material through a homogenization of fractionated thermomechanical pulp (TMP) (1% consistency), as shown in FIG. 1B. On the other hand, the same authors demonstrated that the similar process for sample of bleached kraft pulp (BKP) composed of 75/25 pinus/spruce (conifers) did not produce similar results, and less consistency had to be adopted for mechanical defibrillation by homogenization at high pressure, probably due to the higher cellulose content in the fraction of BKP fines compared to that obtained with TMP.

BR112014000862 A2 discloses a process for producing a nanocellulosic material, comprising fractionating a cellulosic feedstock in the presence of an acid and mechanically treating the cellulose-rich solids to form cellulose fibrils and/or cellulose crystals. Therefore, it does not reveal the treatment of distributed comminution after fiber the stages of fiber size selection/fractionation (fractioning) or serial comminution (defibrillation).

The application U.S. Pat. No. 6,024,834 A discloses a process for fractionating cellulosic fibers by subjecting a first mixture of cellulosic fibers to an effective fractionation medium to separate the first mixture of cellulosic fibers into a second mixture of cellulosic fibers and a third mixture of cellulosic fibers, wherein the second mixture of cellulosic fibers has a fiber dispersion value greater than about 20 milligrams per 100 meters and an average fiber length value of the population greater than about 0.9 millimeter. The document also does not disclose a comminution treatment distributed after stages of fiber size selection/fractionation or serial comminution.

To date, no process approach has been proposed for the production of nanocellulose to consider the use of the fractionation stage between pretreatment, defibrillation and post-treatment.

The present invention provides the incorporation of at least one fractionation unitary operation after at least one defibrillation stage to provide a homogeneous flow for defibrillation, pre- or post-treatment, which results in a higher quality nanocellulose in terms of morphology and rheology.

BRIEF DESCRIPTION OF THE INVENTION

The present invention provides a method, unlike the prior art, with the use of a fractionation unit (unitary operation) between the unitary operations of defibrillation and/or pre- or post-treatment. Thus, for all forms of embodiments, such unitary operations are optimized in terms of the quality of the nanocellulose produced (morphology and rheology) as well as presenting gains in relation to energy consumption in the mechanical process. By using a fractionation stage in the nanocellulose production process, the defibrillation stages are performed with a more homogeneous sample flow in terms of particle size and, thus, the produced nanocellulose will have greater homogeneity in terms of nanofibril size distribution.

BRIEF DESCRIPTION OF THE DRAWINGS

The FIG. 1A is a schematic view of the application of fractionation to nanocellulose characterization.

The FIG. 1B is a schematic view of production of nano-lignocellulose with a sample of low fiber content.

Figure 2A:
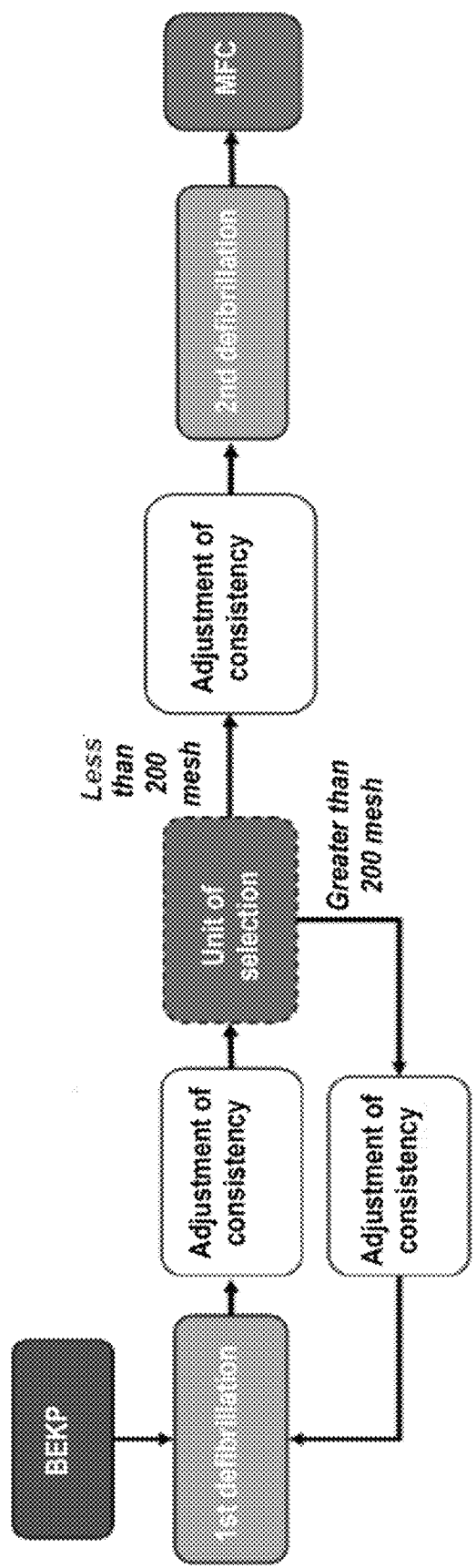

The FIG. 2A is a schematic view of one embodiment of the fractionation application method in the production of nanofibrillated cellulose (CNF) and/or microfibrillated cellulose (MFC).

Figure 2B:
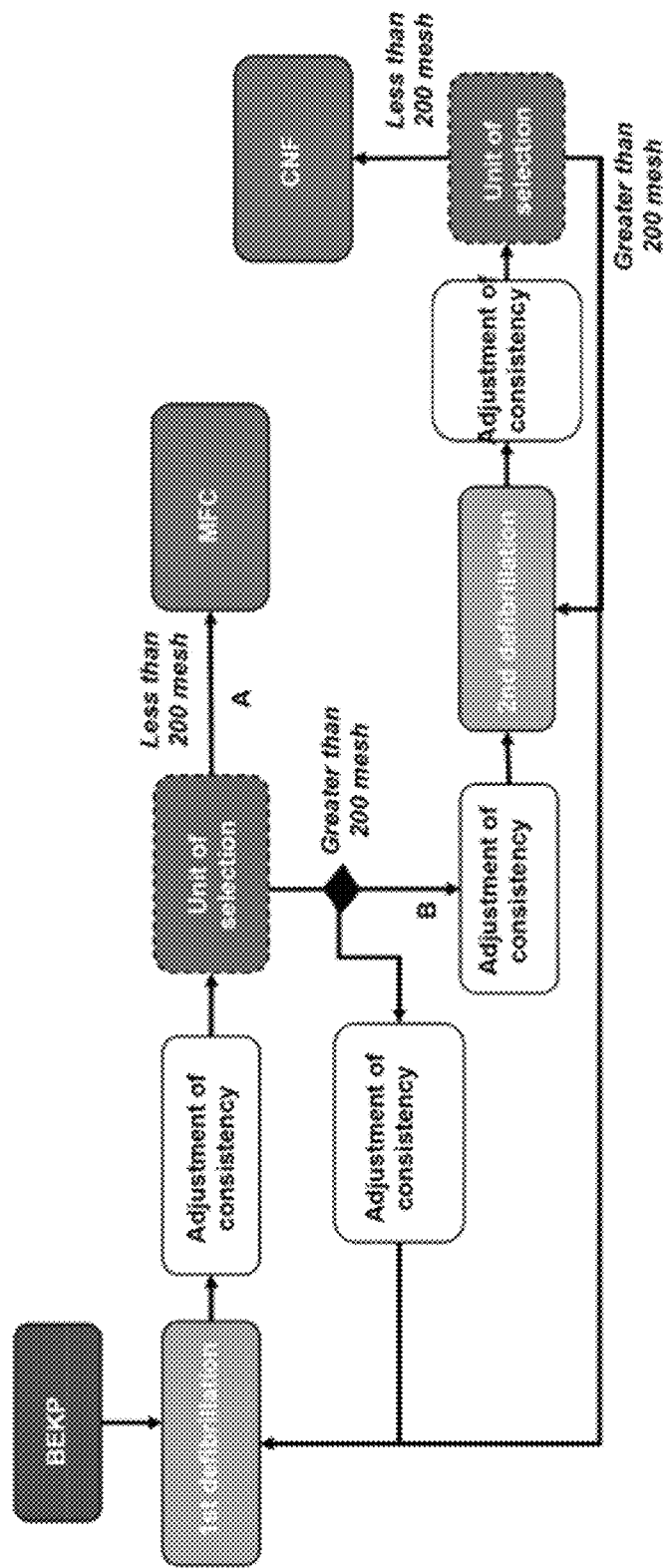

The FIG. 2B is a schematic view of one embodiment of the fractionation application process in the production of nanofibrillated cellulose (CNF) and/or microfibrillated cellulose (MFC) by different types of refining.

Figure 3:
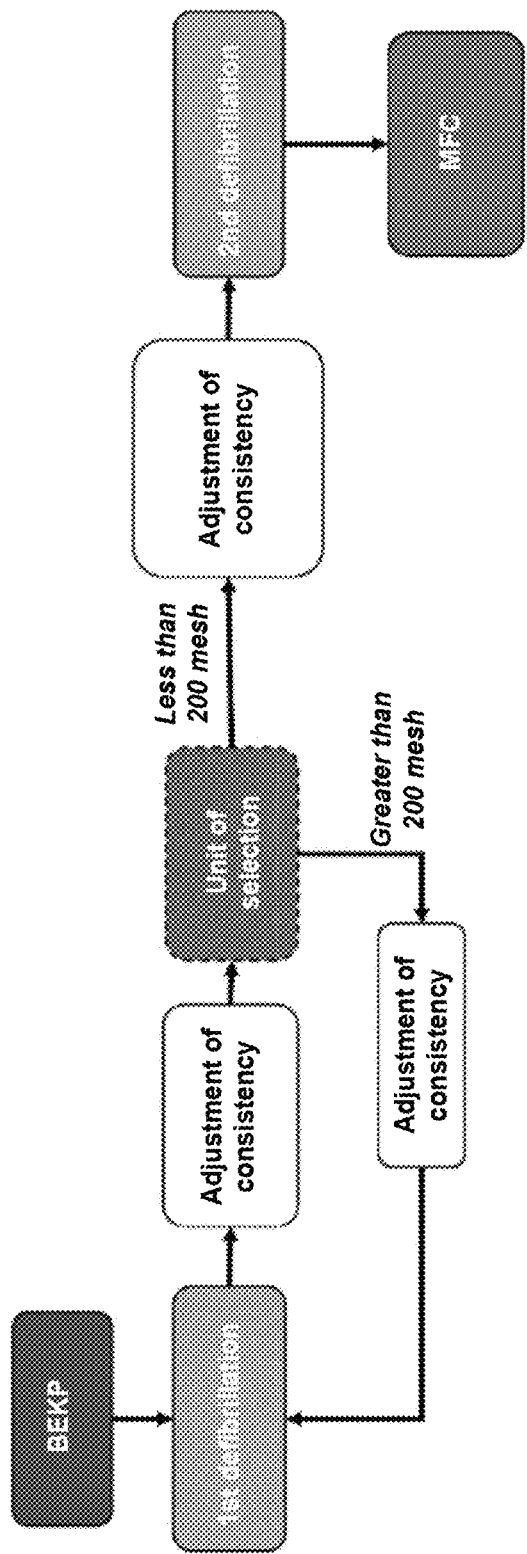
Figure 4:
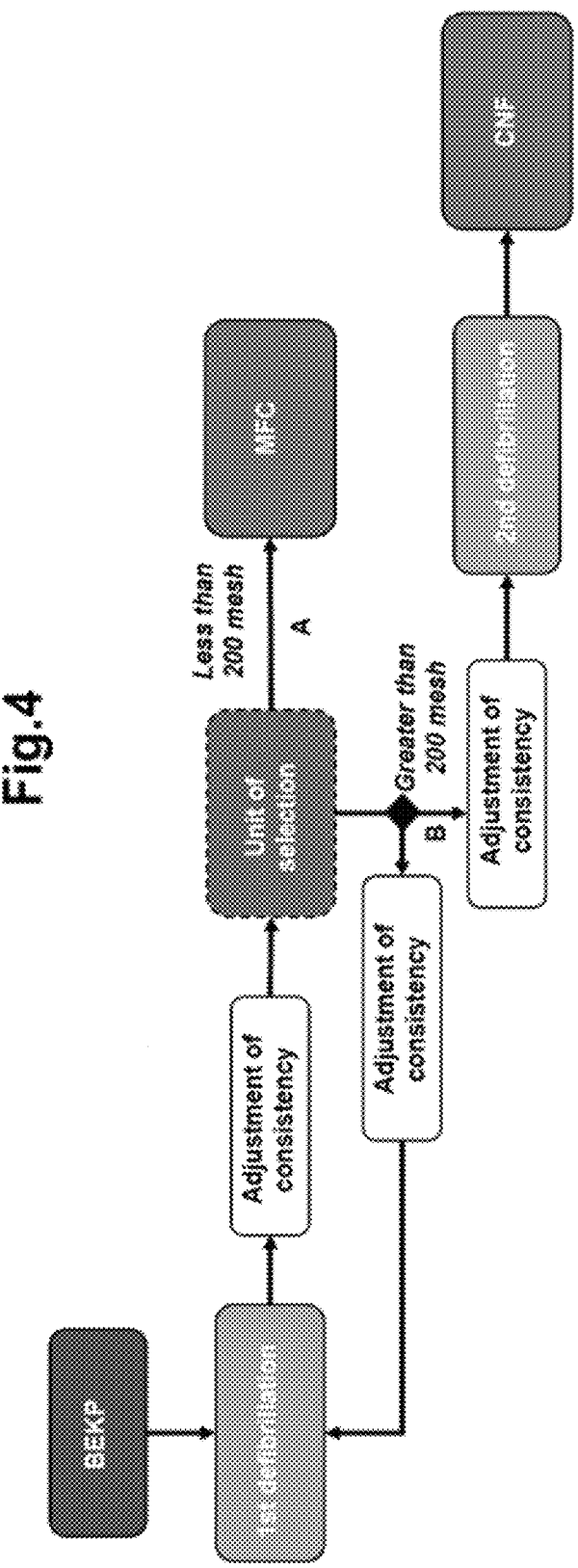

The FIG. 3 is an embodiment of the present invention comprising a selection/fractionation stage and fiber feedback between two comminution stages;

The FIG. 4 is an embodiment of the present invention comprising a selection/fractionation stage and fiber feedback between two comminution stages for multiple methods.

Figure 5:
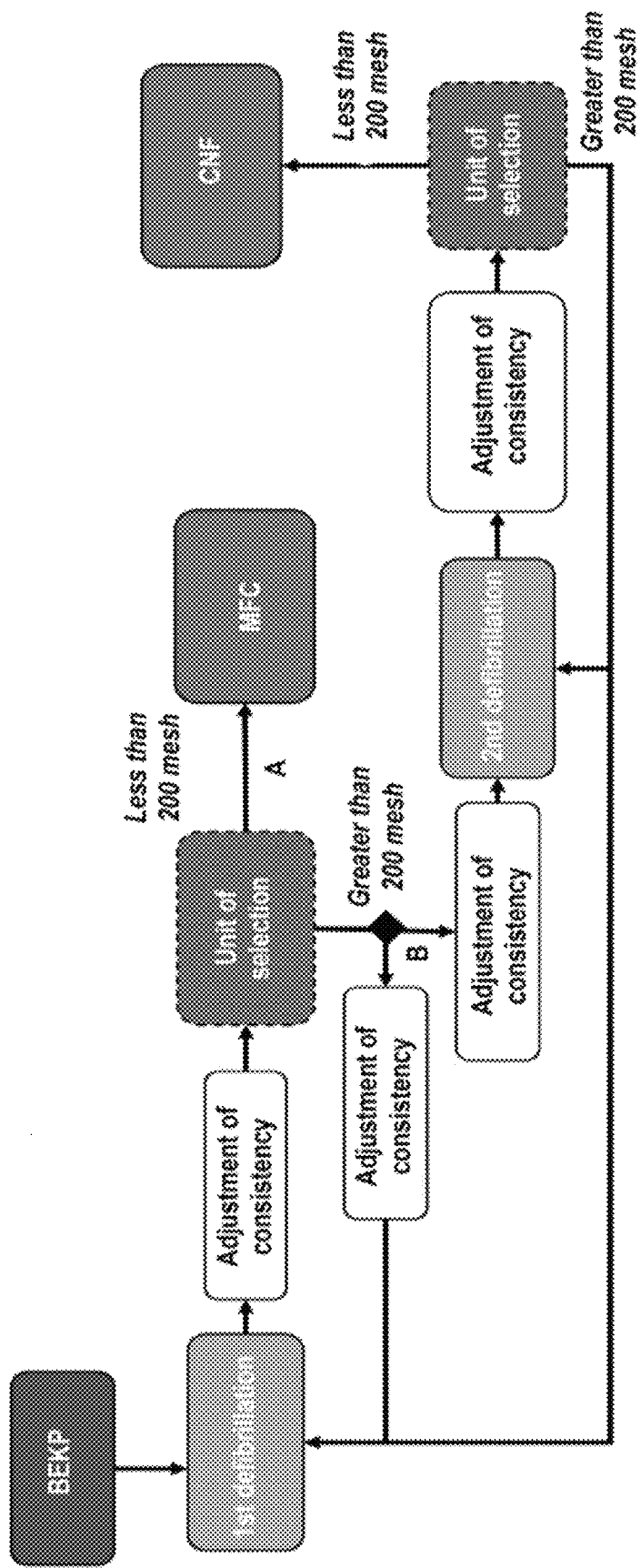

The FIG. 5 is an embodiment of the present invention comprising two stages of selection/fractionation and fiber feedback after two comminution stages for multiple methods.

Figure 6:
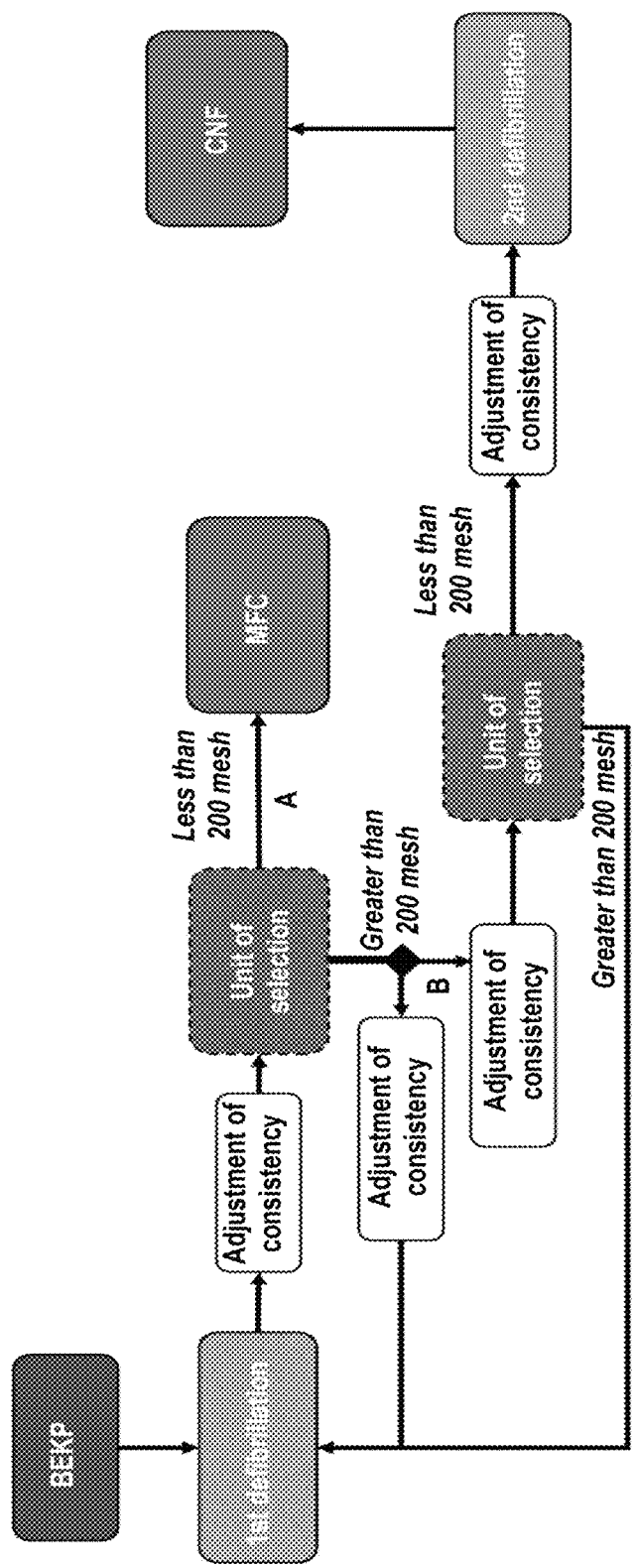

The FIG. 6 is an embodiment of the present invention comprising two serial stages of selection/fractionation and fiber feedback, both between two comminution stages for multiple methods.

Figure 7:
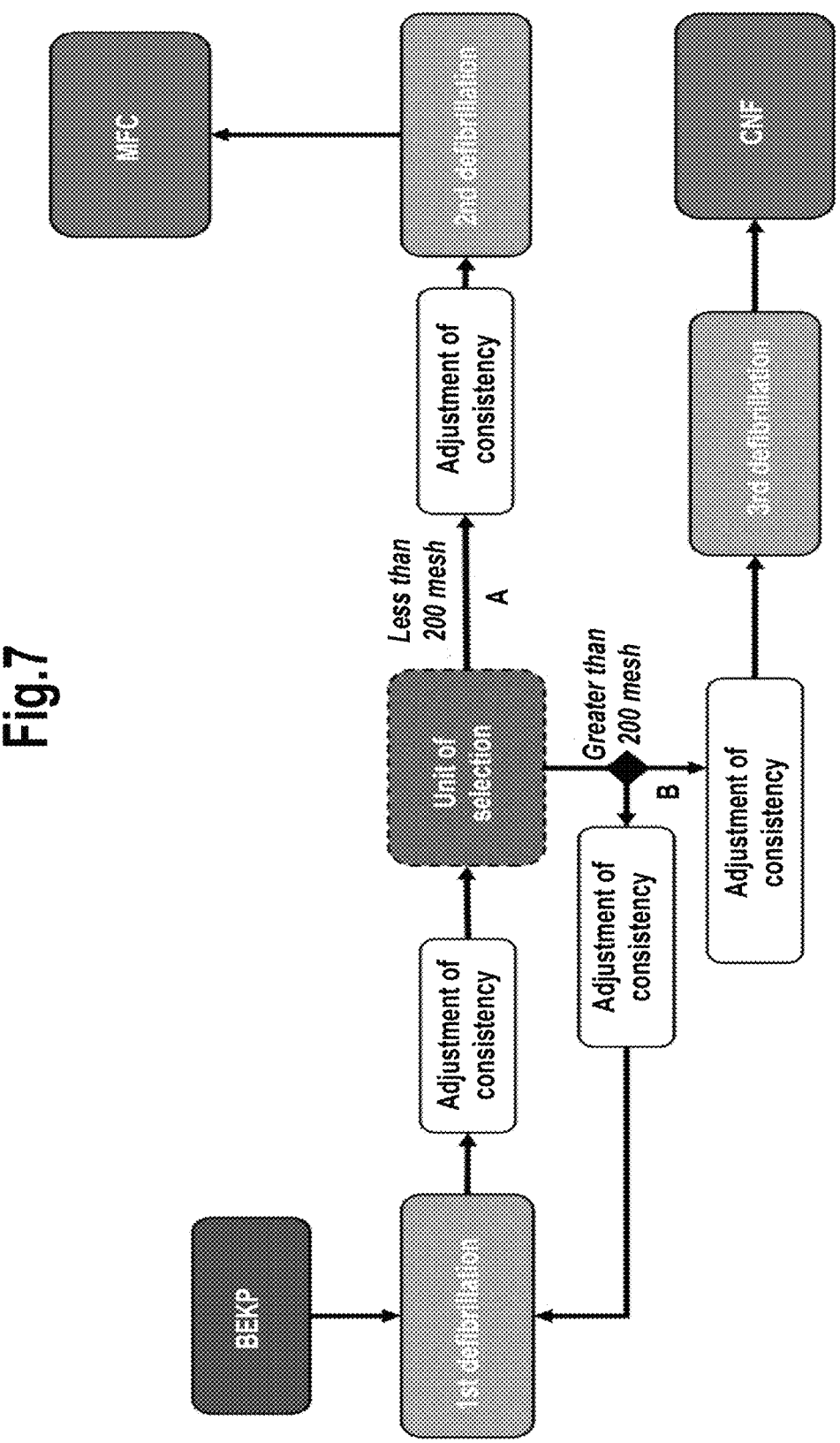

The FIG. 7 is an embodiment of the present invention comprising a selection/fractionation stage and fiber feedback between two comminution stages for multiple methods.

Figure 8:
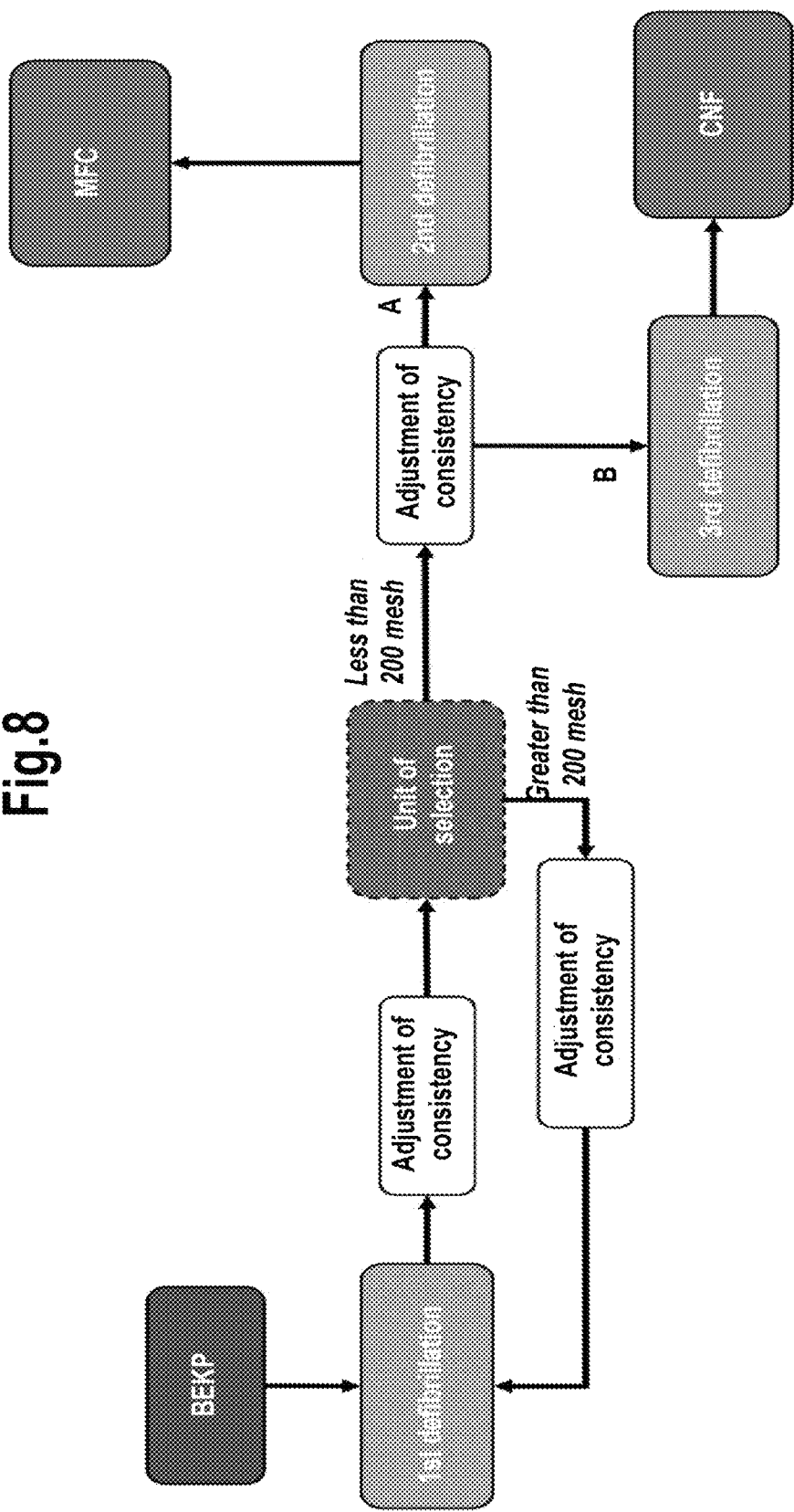

The FIG. 8 is an embodiment of the present invention comprising a selection/fractionation stage and fiber feedback between two consistency adjustment stages for multiple methods.

Figure 9:
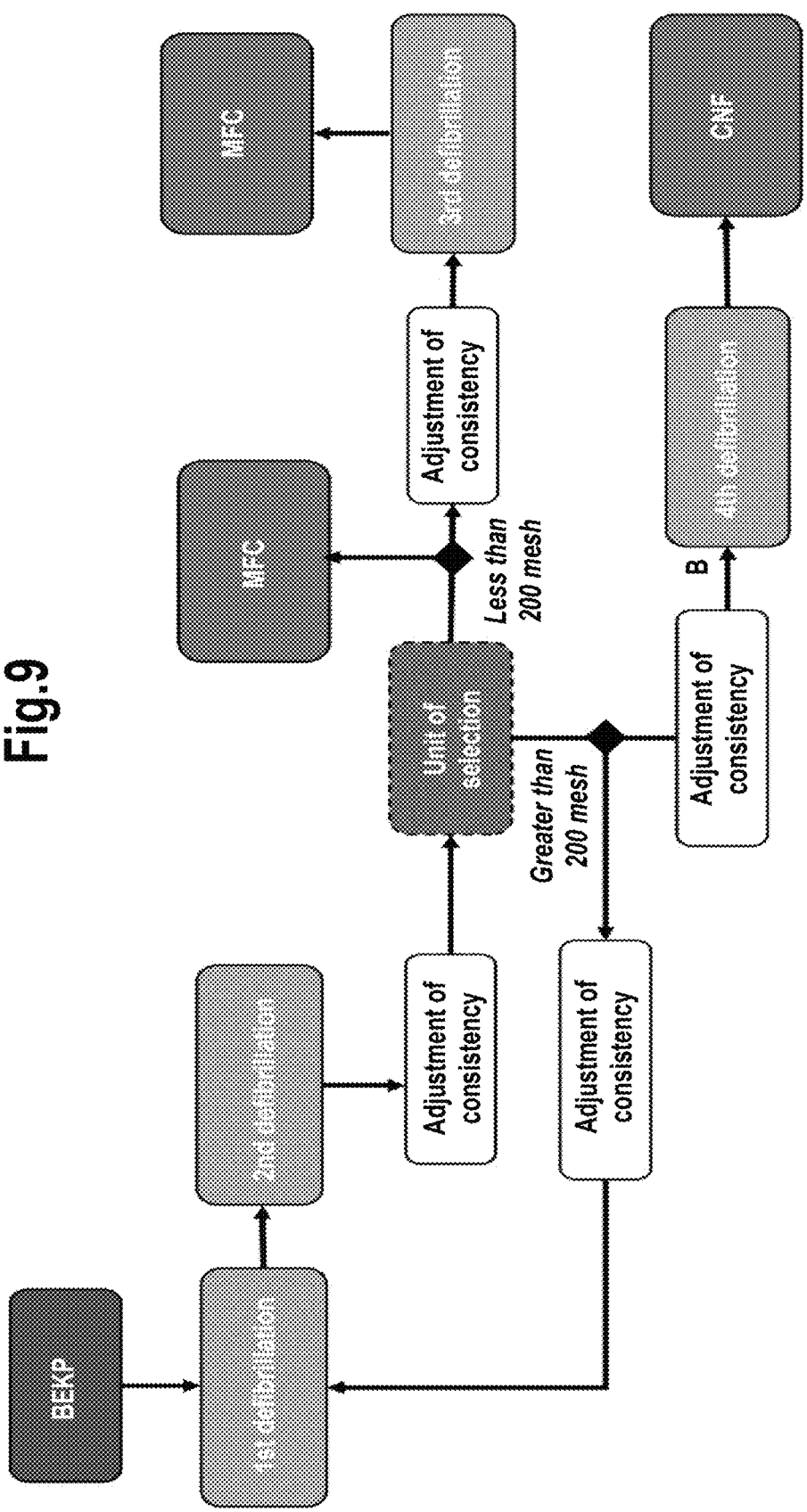
Figure 10:
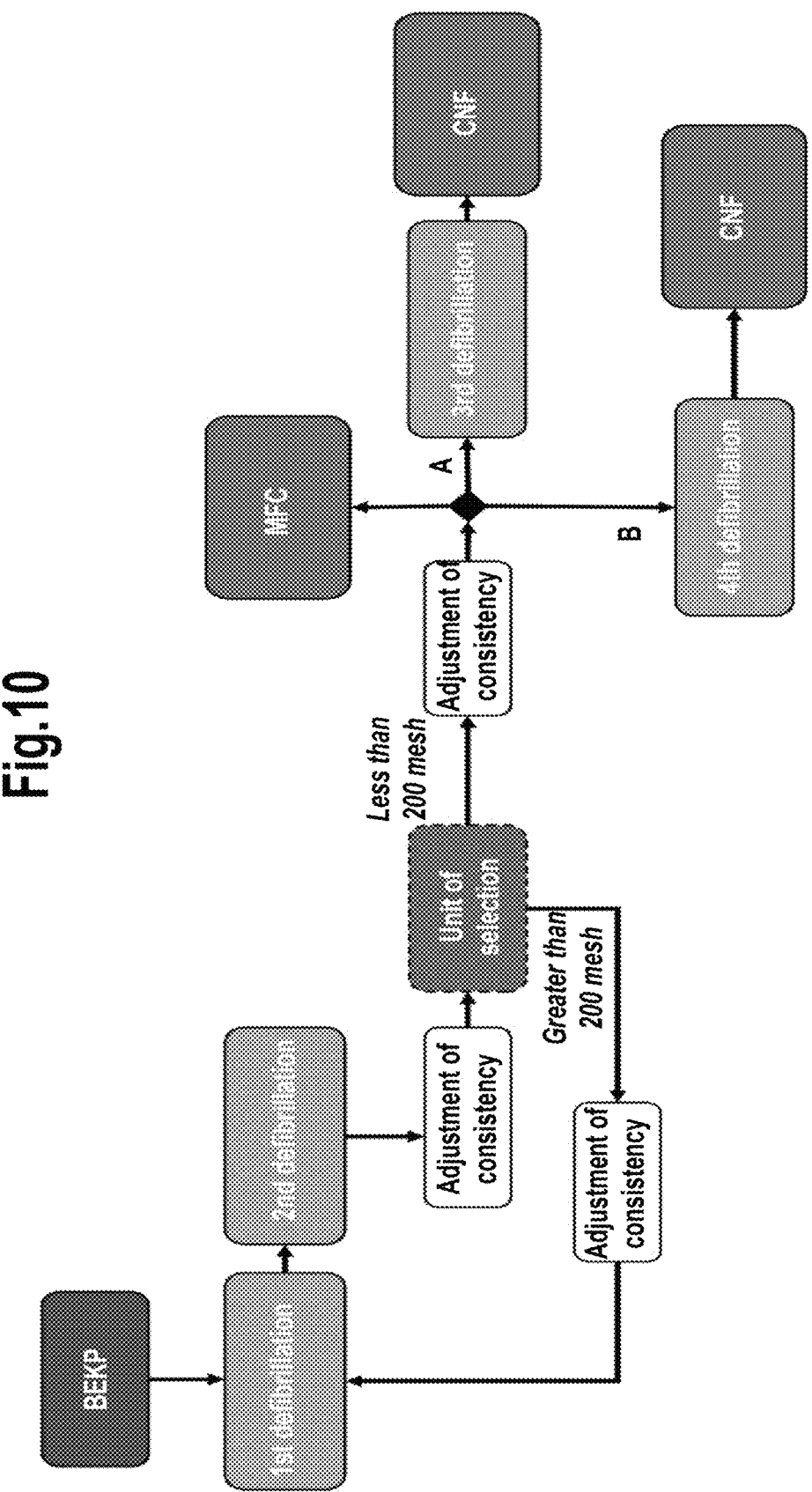
Figure 11:
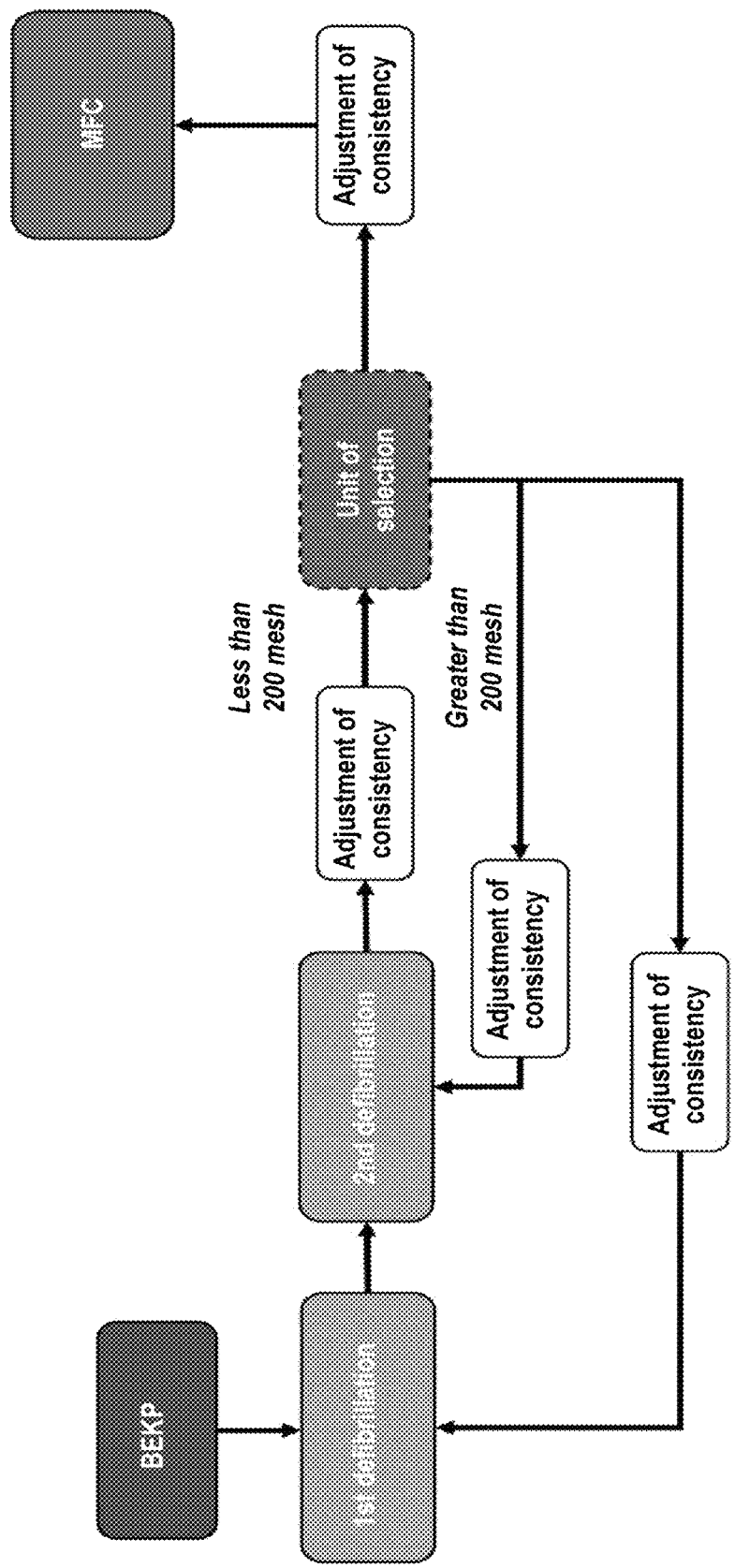

The FIG. 9 is an embodiment of the present invention comprising two serial stages of comminution for multiple methods;

The FIG. 10 is an embodiment of the present invention comprising two serial stages of comminution for multiple methods;

The FIG. 11 is an embodiment of the present invention comprising a selection/fractionation stage and fiber feedback after two defibrillation adjustment stages.

Figure 12:
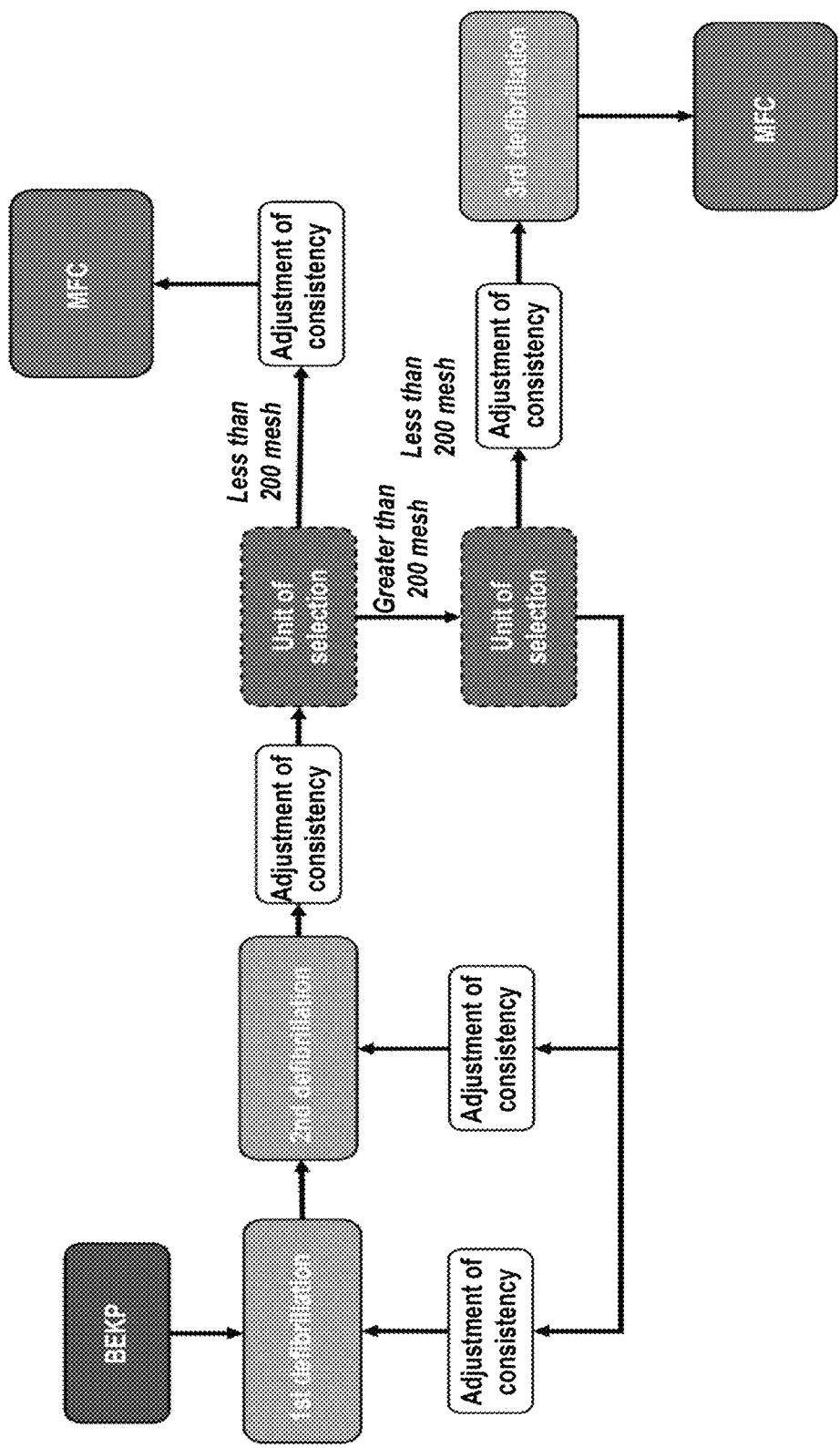

The FIG. 12 is an embodiment of the present invention comprising various selection/fractionation and fiber feedback stages following various defibrillation adjustment stages.

Figure 13:
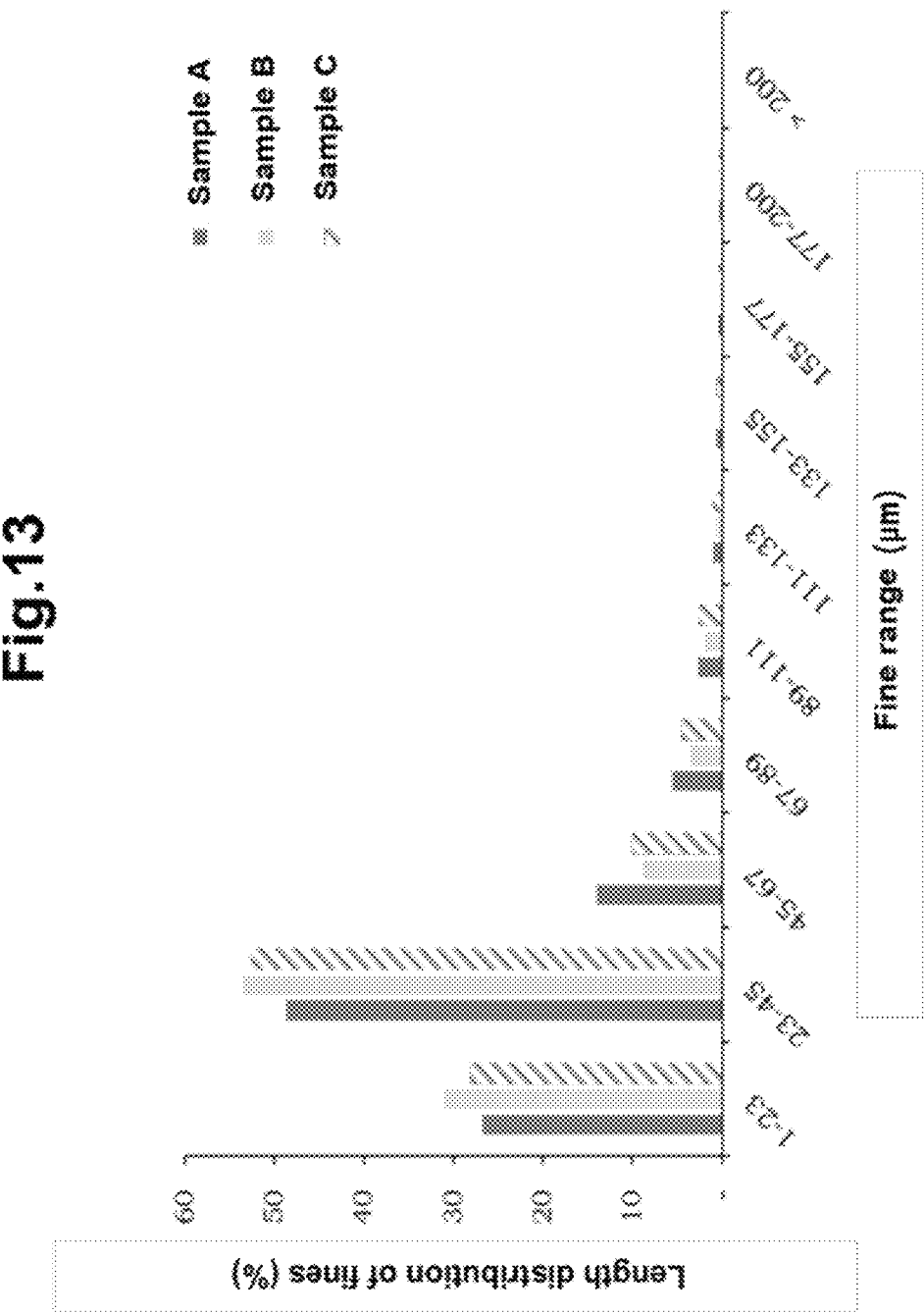

The FIG. 13 shows the Length Distribution of fines (%) per range of fines.

Figure 14:
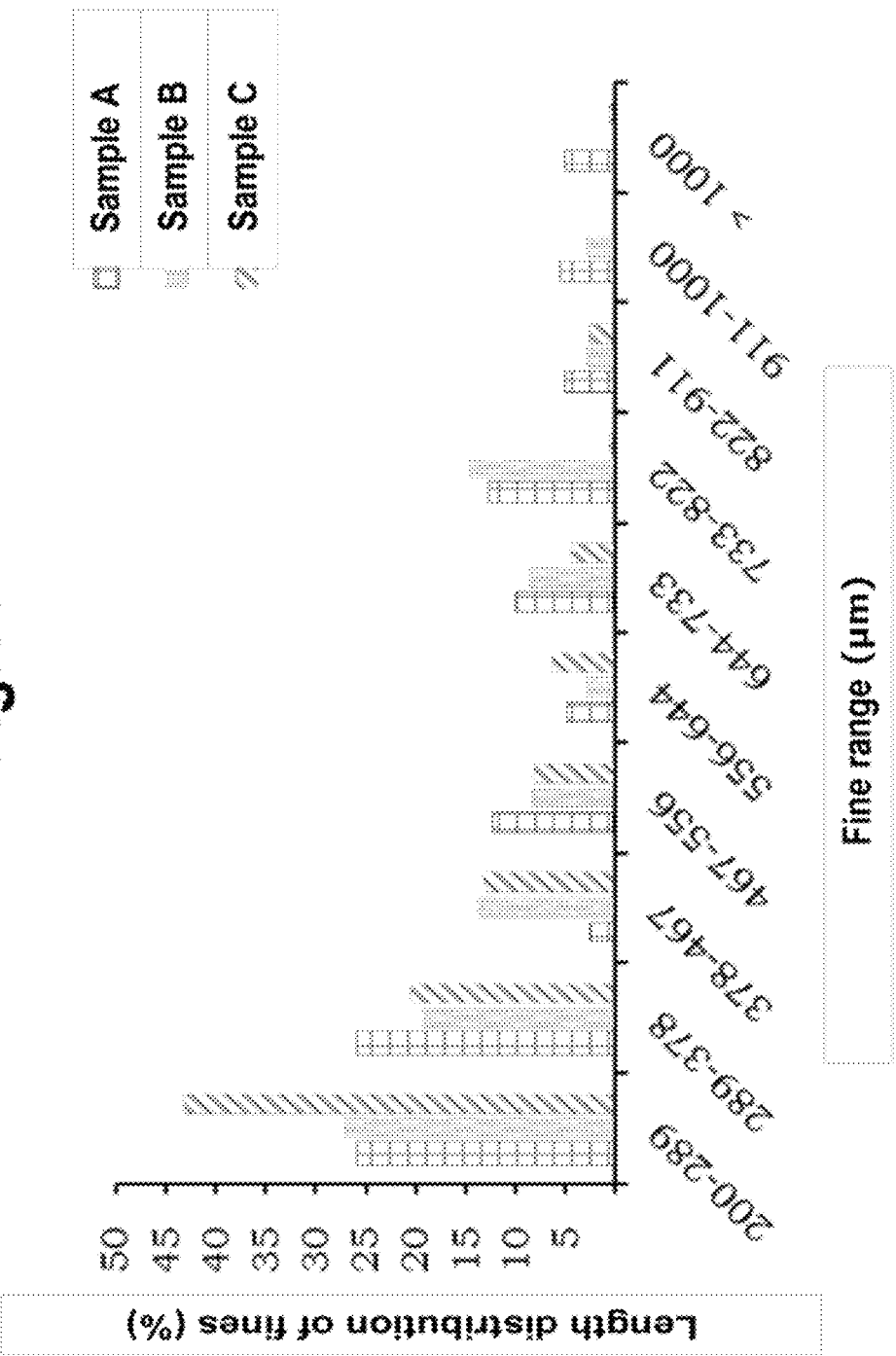

The FIG. 14 shows the Length Distribution of fines (%) per range of fines.

Figure 15:
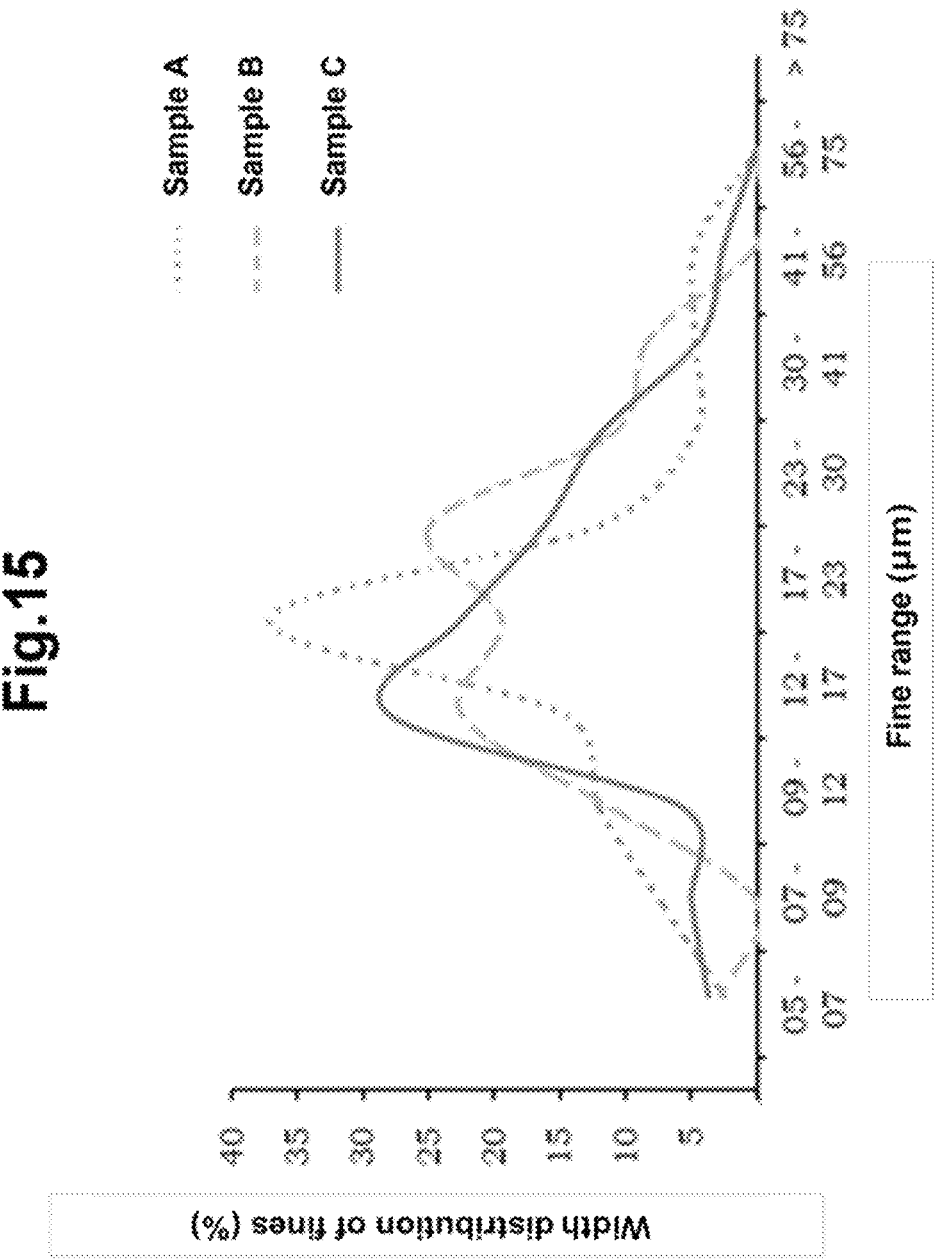

The FIG. 15 shows the thickness distribution of fibers (%) per range of fines (μm).

Figure 16:
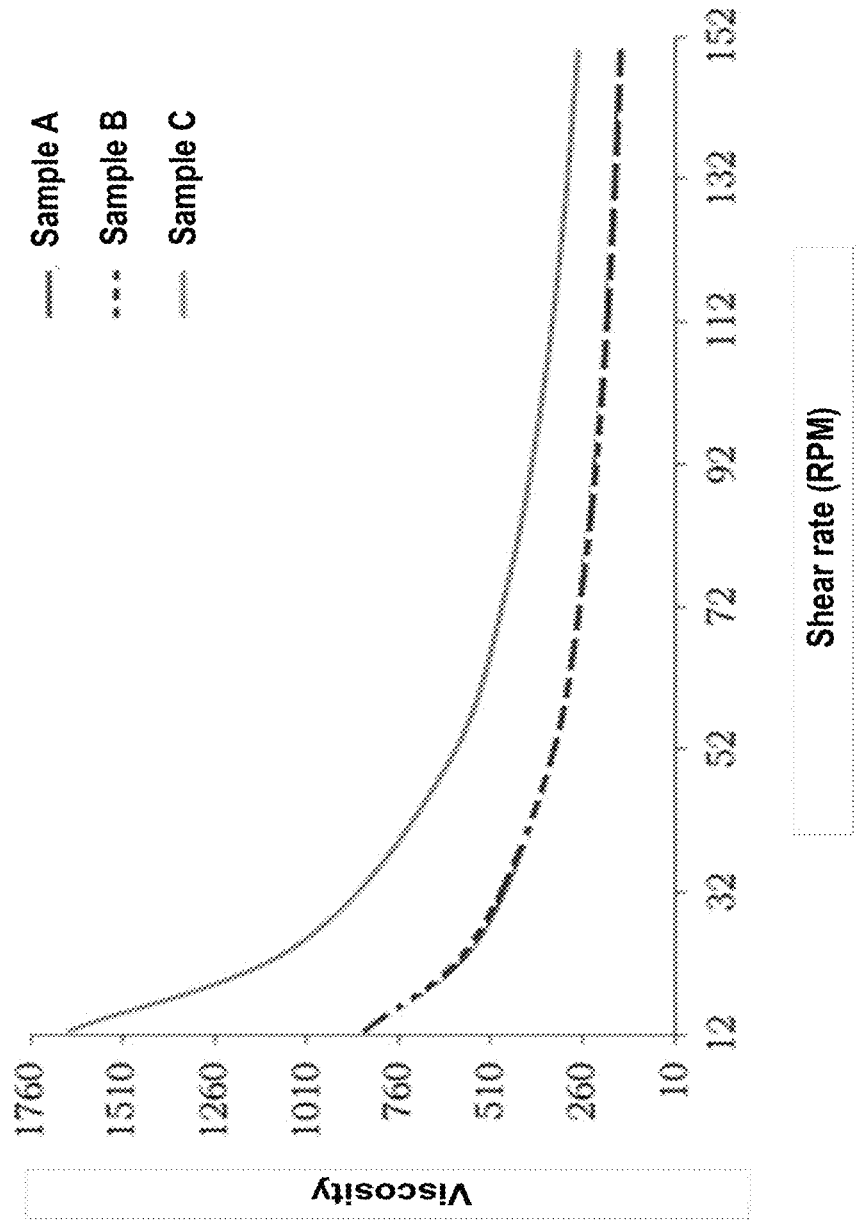

The FIG. 16 shows the variation of viscosity versus shear rate (RPM) with the curve of Sample A covering curve of Sample B.

Figure 17:
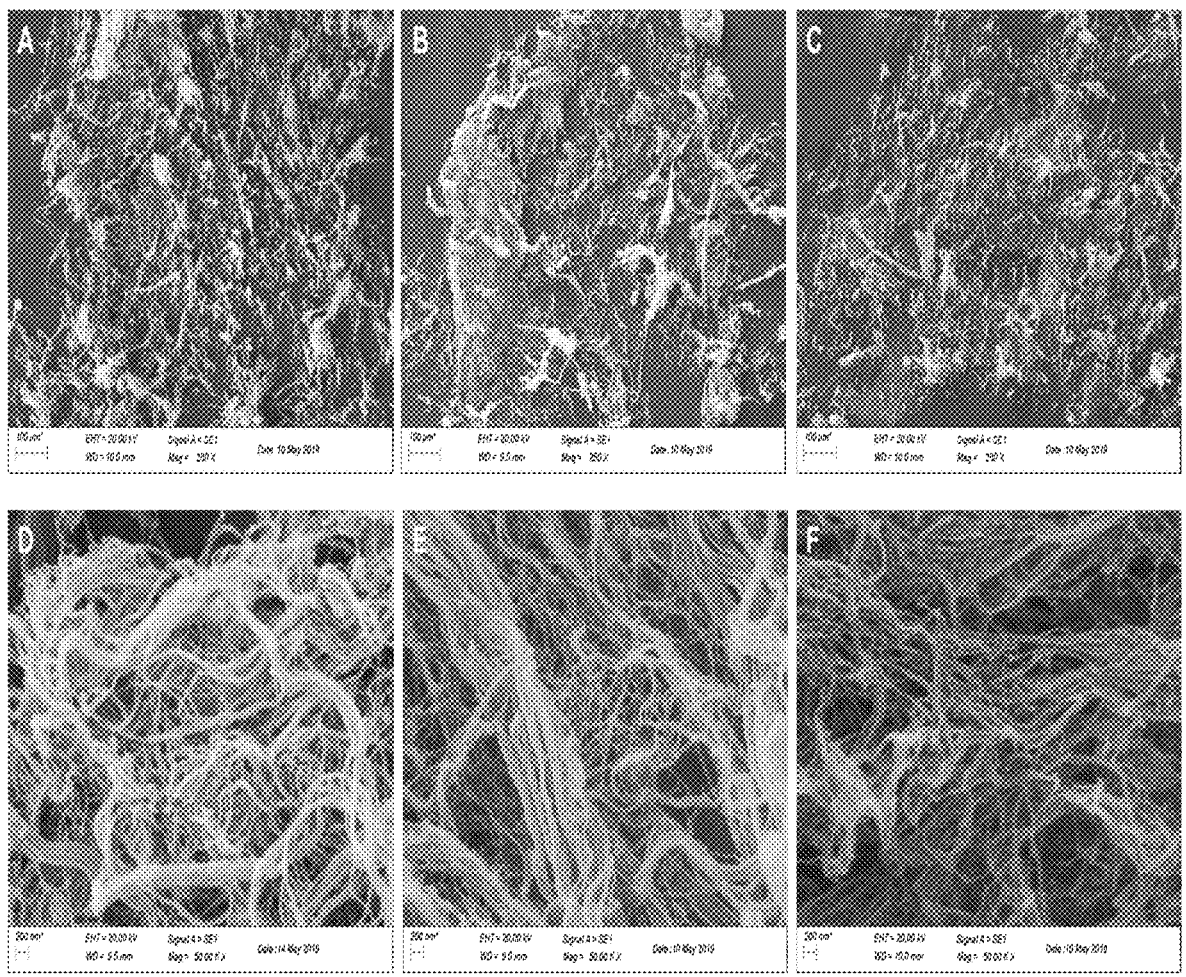

The FIG. 17 illustrates scanning electron microscopy images of unfractionated samples (A and D), reject (B and E) and fractionation accept (C and F) after 5 grinding passes.

Figure 18:
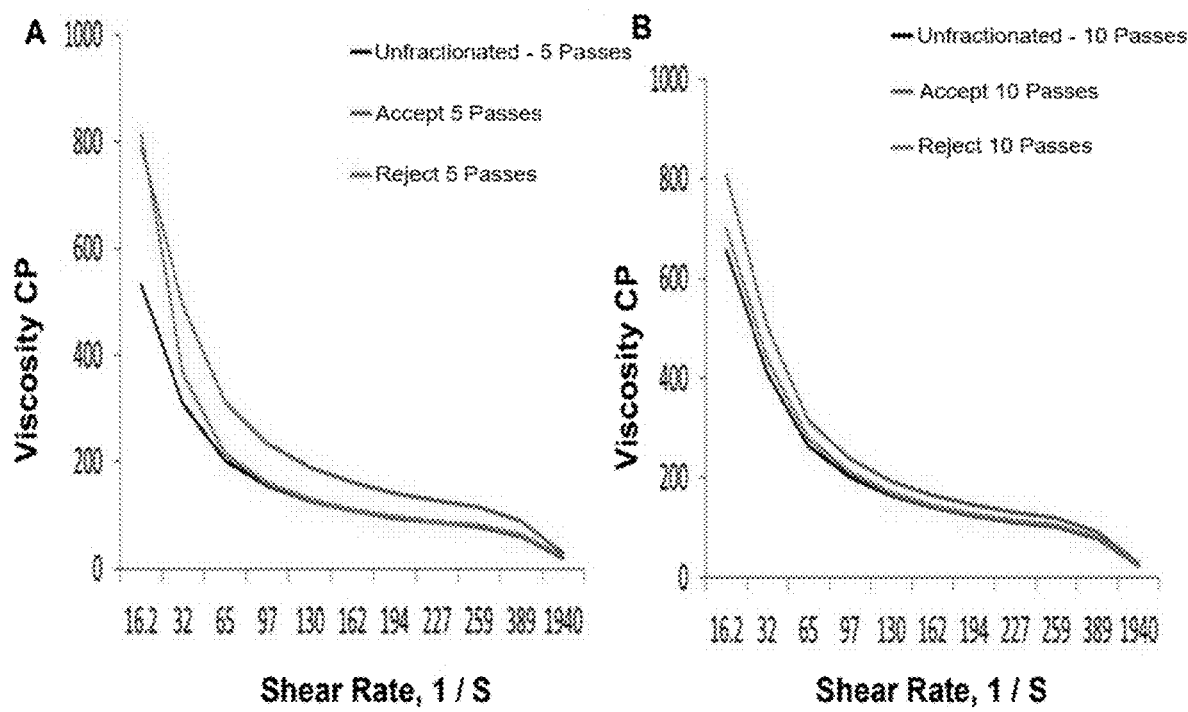

The FIG. 18 illustrates dynamic viscosity profiles of fractionated and unfractionated samples after 5 grinding passes (A) and 10 grinding passes (B).

Figure 19:
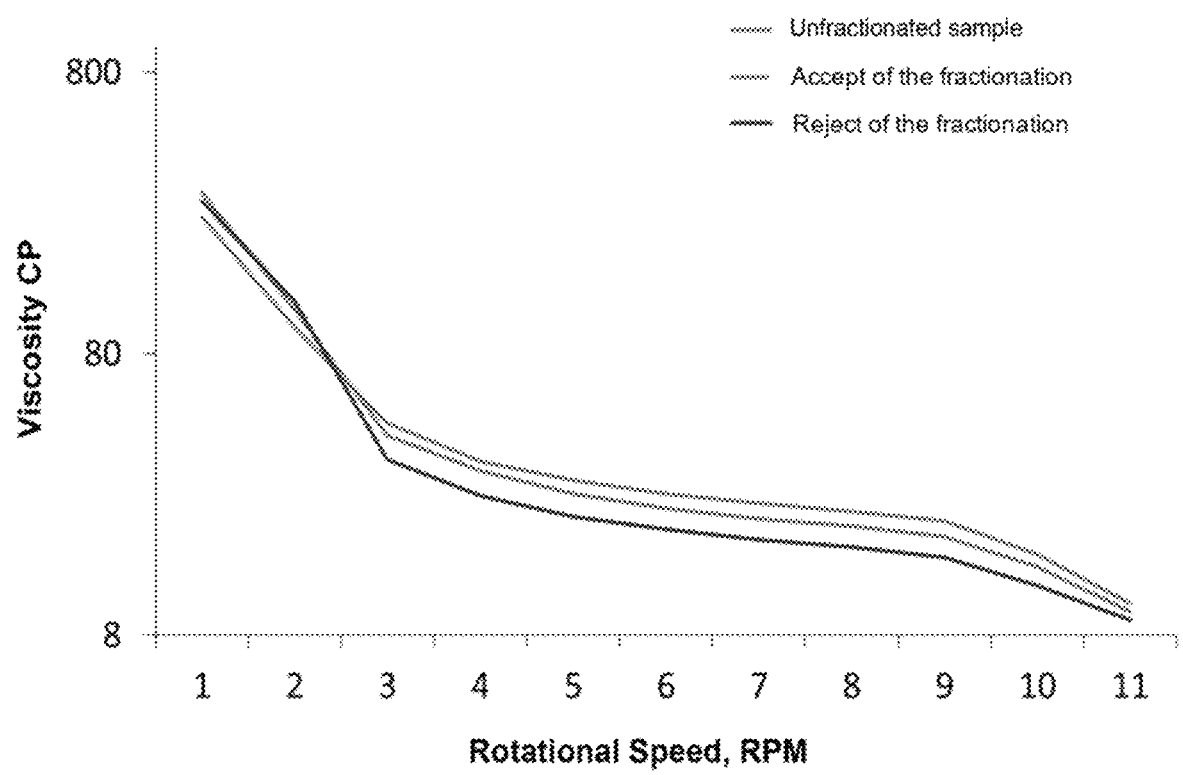

The FIG. 19 illustrates dynamic viscosity profiles of fractionated and unfractionated samples.

Figure 20:
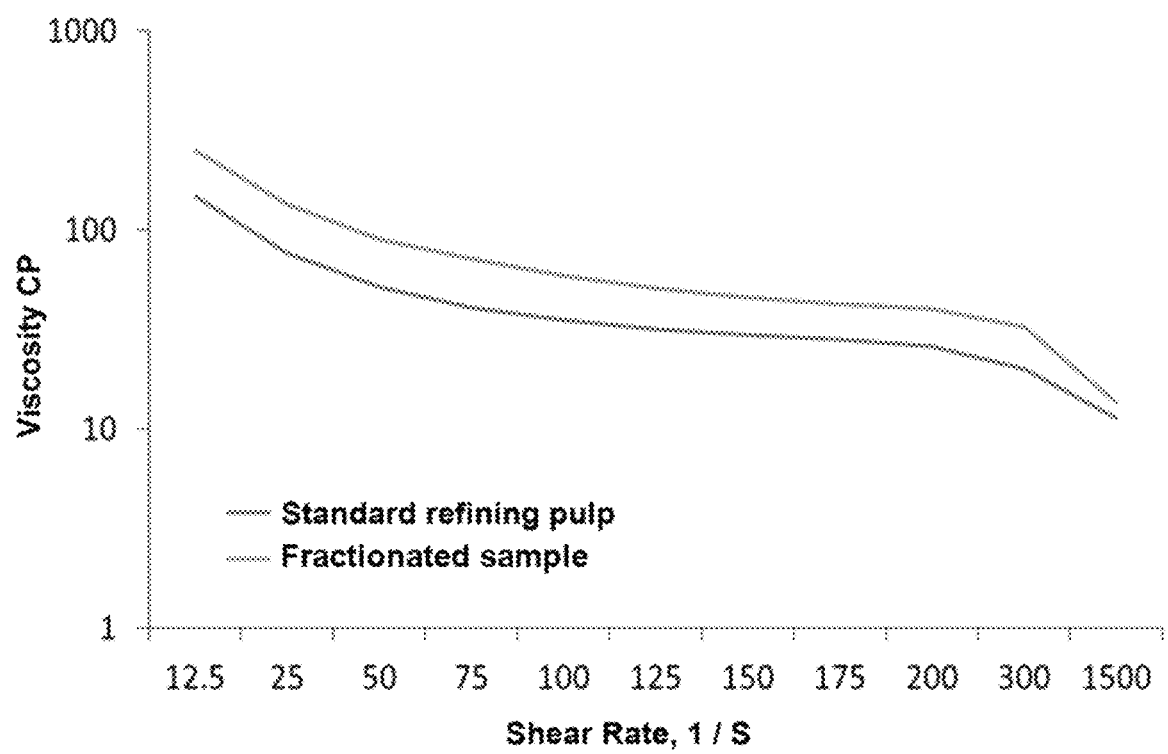

The FIG. 20 illustrates dynamic viscosity profiles of microfibrillated cellulose samples generated by disc refining (fractionated and unfractionated).

DETAILED DESCRIPTION OF THE INVENTION

The present invention provides a method, unlike the literature, in which the authors suggest the use of a fractionation unit between unitary operations of defibrillation and/or pre- or post-treatment. Thus, for all embodiments, such unitary operations will be optimized in terms of homogeneity of the produced nano-cellulose (in morphological terms and distinct rheological profile). More specifically, they suggest the use of a fractionation stage in the nanocellulose production process, and in this way the defibrillation stages will be performed with a more homogeneous sample flow as to the particle size and, therefore, the produced nanocellulose will have more quality and homogeneity in terms of particle size distribution (FIG. 2A).

In addition, the proposed embodiments allow the production of different types of CNF and/or MFC, as demonstrated in the embodiments of the process shown in FIGS. 2B, 4, 5, 6, 7, 8, 9, 10 and 12.

Particularly, the present invention is directed to a process of producing a nanocellulosic material from a previously and partially defibrillated cellulosic feedstock. Preferably, the cellulosic feedstock may be pulp originally from conifer or hardwood, more specifically eucalyptus, or pine, or birch or beech, bleached kraft pulp from eucalyptus (BEKP) or agro-industrial waste such as sugar cane bagasse and straw or rice straw or wheat straw, obtained by: kraft pulp; or sulfite pulping; or steam explosion; or explosion of fiber with ammonia; or dilute acid hydrolysis; or alkaline hydrolysis; or oxidative alkaline treatment; or enzymatic treatment; or organosolv processing. However, there is no limitation on the cellulosic material to be provided at the beginning of the process (stage a).

The method of producing a nanocellulosic material, object of the present invention, occurs between the pre-treatment, the defibrillation and the post-treatment, and comprises at least two stages, one of fractionation and the other of defibrillation of said cellulosic feedstock, being able to have at least one additional stage of mechanical defibrillation or chemical pre-/post-treatment with consistency adjustment stage. The output of at least one of said defibrillation stages comprises returning fibers either to itself or to the same stage. For example, if the first defibrillation stage outputs a first batch of fibers, they may be partially or fully reverted to such stage. Likewise, such fibers may be integrally conveyed to a second defibrillation stage, which outputs a second batch of fiber, which may be partially reverted to the second or to the first stage.

Accordingly, the process, object of the present invention comprises performing a first stage of defibrillation of said feedstock (stage b) followed by a first selection/fractionation stage (stage c). Preferably, the selection/fractionation is made by particles that pass through sieves varying between 50 and 350 mesh (for example up to 200 mesh), called the accept fraction. The particles that did not pass through the selection in the sieve, called the reject fraction, follow (stage d) to the feedback of stage b, that is, they will be submitted again to a comminution stage and, later, selection/fractionation (stage c). The particles of the accept fraction from stage (c) are conveyed (stage e) to a second defibrillation stage (stage f). After repeated iterations of defibrillation of the fibrils of the accept fraction, the result (stage g) is a nanocellulosic material from stage f.

The process, object of the present invention, further comprises additional selection/fractionation stages. At least one further selection/fractionation stage may be contemplated following a selection/fractionation stage (such as stage c).

In addition, the process may have an additional defibrillation stage after defibrillation stage (b).

Additionally, the process, object of the present invention, may comprise a stage of consistency adjustment after at least one of the defibrillation stages or after at least one selection/fractionation stage.

Further, a variant of the process of producing a nanocellulosic material can comprise the stages:
(a) providing a cellulosic feedstock;
(b) performing a first stage of defibrillation of said feedstock;
(c) performing at least a first selection/fractionation stage of the particles;
(d) conveying the stream of the particles of the reject fraction from (c) to stage (b);
(e) conveying the particles of the accept fraction from stage (c) to stage (f);
(f) performing a second defibrillation stage of said feedstock;
(g) recovering nanocellulosic material from stage (f).

Such a variant preferably partially conveys to stage (b) the reject fraction from stage (d). Also preferably, the reject fraction from stage (f) may be fed back to stage (f) or conveyed to stage (b). Further, such process may present an additional selection/fractionation stage after stage (c) and an additional defibrillation stage after stage (b).

Globally, the process, object of the present invention may further comprise a stage of consistency adjustment after at least one selection/fractionation stage.

The nanocellulosic material is preferably a microfibrillated cellulose, nanofibrillated cellulose or a cellulose nanocrystal.

The process is, therefore, a process of enrichment of nanocellulosic material, in which the use of the fractionation stage occurs between the pre-treatment, the defibrillation and the post-treatment, comprising at least one stage of selection/fractionation of a defibrillation product from the defibrillation stage to the same defibrillation stage or to the previous defibrillation stage in order to provide a nanocellulosic material, or to an additional defibrillation stage.

Example 1

According to the approach described in FIG. 2A, the process of the invention occurs between the pre-treatment, the defibrillation and the post-treatment. An eucalyptus bleached kraft pulp in suspension at 4% consistency (solids content) was subjected to the disc refining process for 6.0 h, until it reached 70.30% of L-fines content (fines in length base) or 33.35% of A-fines content (fines in area base) at 57.93±1.43° C. The resulting material was then subjected to a fractioning process at the Bauer McNETT unit employing screen/sieve with 200 mesh orifices. As a result of the fractionation stage, approximately 43% of mass recovery was obtained in the reject fraction (fraction collected in another stream that did not pass through the screen in the fractionation) and 56% in the accept fraction, with 22% and 94% of L-fines, respectively, for the reject and accept fractions. Both fractions underwent thickening (consistency adjustment) on silk screen (550 mesh), resulting in 21.28% of consistency for the reject fraction and 17.73% for the accept fraction, as presented in the approach of FIG. 2A.

The materials resulting from the fractionation (reject and accept fractions) as well as the MFC sample with 70.30% of fines-L content, were then subjected to a dilution up to 1% of consistency and subsequent defibrillation by grinding using 10 passes in Masuko (Supermasscolloider—MKCA6) employing ultra-fine 120 #MKGC (Silicon Carbide—SiC) grinding stones. For the purpose of comparing the morphology of the samples, FIGS. 13, 14 and 15 present the distribution profiles (%) of L-fines, fiber length and fiber width, respectively.

As shown in FIG. 13, the fractionated and processed samples in Masuko present a gain in the increase of the fraction of fines of smaller size range (1-23 μm), to the stage that the other ranges are very similar. On the other hand, considering the fiber length distribution (FIG. 14), the use of fractionation between the defibrillation process (refining and grinding) led to an increase in the percentage of the fraction of the smaller length range (200-289 μm), indicating that the use of fractionation according to the approach of FIG. 2A results in a decrease in fiber size after defibrillation, when compared to the distribution of the other samples. Still in terms of morphology, the approach of FIG. 2A provides a reduction in fiber width and a more homogeneous sample (greater relation between height and width of the base of the curve) (FIG. 15).

Positive effects were also observed on the rheological behavior of the samples, as shown in FIG. 16, indicating that there is an enormous gain in the thixotropic properties of the nanofibrillated cellulose produced according to the approach of the process demonstrated in FIG. 2A.

The benefits of the process approach presented can also be identified in the results of Table 1, in which it is possible to perceive the gain in fines content in area, as well as in terms of energy spent in the final mechanical process.

TABLE 1

Average value of the fines content based on area and energy spent in the final defibrillation of the samples.

| Property | Defibrillated without fractionation | Reject of the fractionation after defibrillation | Accept of the fractionation after defibrillation |
| --- | --- | --- | --- |
| Fines content in area (%) | 61.23 | 85.98 | 90.57 |
| Energy spent on final mechanical defibrillation (kWh/kg) | 37 | 35 | 33 |

Example 2

According to the approach described in FIG. 2A, the process of the invention occurs between the pre-treatment, the defibrillation and the post-treatment. An eucalyptus bleached kraft pulp in suspension at 4% of consistency (solids content) was subjected to a disc refining process for 6.0 h, until it reached 70.30% of L-fines content (fines in length base) or 33.35% of A-fines content (fines in area base) at 57.93±1.43° C. The resulting material was then subjected to a fractioning process at the Bauer McNETT unit employing screen/sieve with 200 mesh orifices. As a result of the fractionation stage, approximately 43% of mass recovery was obtained in the reject fraction (fraction collected in another stream that did not pass through the screen in the fractionation) and 56% in the accept fraction, with 22% and 94% of L-fines, respectively, for the reject and accept fractions. Both fractions underwent thickening (consistency adjustment) on silk screen (550 mesh), resulting in 21.28% of consistency for the reject fraction and 17.73% for the accept fraction, as presented in the approach of FIG. 2A.

The materials resulting from the fractionation (reject and accept fractions) were then subjected to a dilution of up to 1% of consistency and subsequent defibrillation by grinding using 10 passes in Masuko (Supermasscolloider—MKCA6) using ultra-fine 120 #MKGA (Aluminum Oxide—Al$_2$O$_3$) grinding stones. For the purpose of comparing the morphology of the samples after the grinding process, FIG. 17 shows the images obtained by scanning electron microscopy. As shown in the MEV Figures, it is possible to identify the highest level of agglomeration after grinding the fibrils in the unfractionated samples and in the reject of the fractionation, when compared to the accept sample of the fractionation.

Additionally, positive effects were also observed in the rheological behavior of the samples, as shown in FIG. 18, indicating that there is a huge gain in the thixotropic properties of the nanofibrilated cellulose produced according to the approach of the process demonstrated in FIG. 2A, for the different numbers of passes in the grinding stage.

Example 3

According to the approach described in FIG. 2A, the process of the invention occurs between the pre-treatment, the defibrillation and the post-treatment. A bleached eucalyptus Kraft pulp (BEKP) in suspension at 4% of consistency (solids content) was subjected to a disc refining process (18.66 km/rev) for 6.0 h, until it reached 69.89% of L-fines content (fines based on length) at 57.93±1.43° C. The resulting material was then diluted to 3.5% of solids and subjected to a fractionation process with a pressurized basket with 75 mesh screen (200 μm). In this case, the fractionation occurred after diluting the suspension to 3.5% of consistency, with a reject rate per volume of 40% with a rotor speed of 12 m/s and an average passage speed of 0.07 m/s.

As the main results of the fractionation, it can be seen, as shown in Table 2, that the segregation of particles occurred according to their respective sizes, reflected in the values of average length of fibers in each fraction, as well as in the respective fines contents. In addition, the consistency values were also different, with the accept fraction being more diluted (2.81% of consistency) than the fraction obtained in the reject (3.91% of consistency).

TABLE 2

Data of fines contents and average fiber length for standard and fractionated samples.

| Sample | Fiber length (μm) | Contents of Fines-80 in Length (%) |
|---|---|---|
| Unfractionated | 407 | 69.89 |
| Reject of the fractionation | 414 | 66.15 |
| Accept of the Fractionation | 388 | 75.12 |

The efficiency of the fractionation process in improving the quality of the microfibrillated cellulose suspension is also evidenced in the respective dynamic viscosity profiles (thixotropic properties), as shown in FIG. 19.

The suspension generated in the accept of the fractionation was subjected to refining with discs using a 12-inch disc with 95.5 km/s (3.82 km/rev) of cut length. For comparison, a BEKP sample was subjected to disk refining using two 12-inch disc refining stages with 44.25 km/s (1.77 km/rev) and 95.5 km/s (3.82 km)/rev) of cut length of the discs used in the two successive refining stages. In this case, the first stage resulted in a sample with 65% of fines in length or 34.1% of fines in area. The refined samples (standard BEKP and accept of the fractionation) were analyzed for fines content (fines defined as particles smaller than 80 μm, and fiber the other particles) and are shown in Table 3, indicating gains resulting from the use of fractionation between the defibrillation stages by refining discs, as well as demonstrated for grinding defibrillation in Example 1.

TABLE 3

Data of fines contents and for standard and fractionated samples

| Sample | Contents of Fines-80 in Area (%) | Contents of Fines-80 in Length (%) |
|---|---|---|
| Standard | 80.5 | 94.5 |
| Fractionated sample | 90.6 | 97.9 |

In addition to the results of morphological analyzes, there are also gains in the thixotropic properties of the nanofibrillated cellulose produced according to the process approach demonstrated in FIG. 20.

The invention claimed is:

1. Process for producing a nanocellulosic material, from a cellulosic feedstock, comprising at least two stages of defibrillation of said cellulosic feedstock, wherein the process comprises the step:
   (a) providing a cellulosic feedstock;
   (b) performing a first defibrillation stage of said feedstock;
   (c) performing an adjustment of a consistency of the defibrillated feedstock of stage (b);
   (d) performing at least a first selection/fractionation stage of the feedstock of stage (c);
   (e) conveying the stream of the particles of a reject fraction from (d) to stage (b);
   (f) conveying particles of an accept fraction from stage (d) to stage (g);
   (g) performing a second defibrillation stage of said feedstock; and
   (g) recovering nanocellulosic material from stage (g).

2. The process for producing a nanocellulosic material, according to claim 1, wherein the fractionation stage is further performed between a pre-treatment stage and the first defibrillation stage and/or between the second defibrillation stage and a post-treatment stage.

3. The process according to claim 1, further comprising an additional selection/fractionation stage after stage d.

4. The process according to claim 3, further comprising an additional defibrillation stage after stage (b).

5. The process according to claim 1, comprising a consistency adjustment stage after at least one selection/fractionation stage.

6. The process according to claim 1, wherein said nanocellulosic material is a microfibrillated cellulose and/or nanofibrillated cellulose.

7. The process for producing a nanocellulosic material, according to claim 1, comprising the stages:
   (a) providing a cellulosic feedstock;
   (b) performing a first stage of defibrillation of said feedstock;

(c) performing an adjustment of consistency of the defibrillated feedstock of stage (b);
(d) performing at least one first stage of selection/fractionation of the feedstock of stage (c) to produce particles that pass through a sieve ranging from 50 to 350 mesh;
(e) conveying a stream of particles of a reject fraction from stage (d) to stage (b);
(f) conveying particles of an accept fraction from stage (d) to stage (g);
(g) performing a second defibrillation stage of said feedstock;
(h) recovering nanocellulosic material from stage (g).

8. The process according to claim 7, wherein the sieve of stage (d) is a 75 mesh sieve.

9. The process according to claim 7, wherein the sieve of stage (d) is a 200 mesh sieve.

10. The process according to claim 7, wherein the stream of the reject fraction from stage (d) is partially conveyed to stage (b) and partially conveyed to stage (g).

11. The process according to claim 10, wherein the stream of the reject fraction from stage (g), is fed back to stage (g) or conveyed to stage (b).

12. The process according to claim 11, further comprising an additional selection/fractionation stage after stage (d).

13. The process according to claim 12, further comprising an additional defibrillation stage after stage (b).

14. The process according to claim 7, comprising a consistency adjustment stage after at least one selection/fractionation stage.

15. Process for producing a nanocellulosic material according to claim 1, comprising at least one stage of feedback of a defibrillation product from a defibrillation stage to the same defibrillation stage or a previous defibrillation stage in order to provide an enriched nanocellulosic material.

* * * * *